(12) United States Patent
Choi

(10) Patent No.: US 9,149,746 B2
(45) Date of Patent: Oct. 6, 2015

(54) HIGH SPEED FILTRATION DEVICE USING POROUS MEDIA, AND BACKWASH METHOD THEREOF

(75) Inventor: Jin Nak Choi, Seoul (KR)

(73) Assignee: Sung Pil Choi, Gangnam-gu (KR)

( * ) Notice: Subject to any disclaimer, the term of this patent is extended or adjusted under 35 U.S.C. 154(b) by 171 days.

(21) Appl. No.: 13/503,845

(22) PCT Filed: Oct. 25, 2010

(86) PCT No.: PCT/KR2010/007312
§ 371 (c)(1),
(2), (4) Date: Apr. 24, 2012

(87) PCT Pub. No.: WO2011/052938
PCT Pub. Date: May 5, 2011

(65) Prior Publication Data
US 2012/0211430 A1  Aug. 23, 2012

(30) Foreign Application Priority Data

Oct. 26, 2009 (KR) .................. 10-2009-0101662
Apr. 16, 2010 (KR) .................. 10-2010-0035553
Apr. 19, 2010 (KR) .................. 10-2010-0035875
Apr. 19, 2010 (KR) .................. 10-2010-0036109

(51) Int. Cl.
*B01D 37/03* (2006.01)
*B01D 37/04* (2006.01)
(Continued)

(52) U.S. Cl.
CPC .............. *B01D 39/02* (2013.01); *B01D 41/02* (2013.01); *B01D 2239/1291* (2013.01); *C02F 1/004* (2013.01); *C02F 2303/16* (2013.01)

(58) Field of Classification Search
None
See application file for complete search history.

(56) References Cited

U.S. PATENT DOCUMENTS 5,102,535 A * 4/1992 Grohmann ............... 210/104
5,445,740 A * 8/1995 Malone .................... 210/618
(Continued)

FOREIGN PATENT DOCUMENTS

JP 2004-008978 A 1/2004
JP 2008-055282 A 3/2008
(Continued)

OTHER PUBLICATIONS

PCT International Search Report for PCT Counterpart Application No. PCT/KR2010/007312 containing Communication relating to the Results of the International Search Report, 5 pgs., (Jun. 29, 2011).

*Primary Examiner* — Robert James Popovics
(74) *Attorney, Agent, or Firm* — Blakely, Sokoloff, Taylor & Zafman LLP

(57) ABSTRACT

The present invention relates to a porous media-mediated high speed filtration device for easy backwash, wherein the inflow water to be filtered is guided to an upper portion of the high speed filtration device and is filtered by downflow and porous media are backwashed for maintaining optimum filter efficiency by blocking the flow of inflow water and water to be treated after sensing the level of the inflow water or the change in the flux of the water to be treated, supplying backwash water and/or air by upflow through a backwash equipment to separate pollutants in the porous media by the collision and friction between the porous media by flowing of the porous media through the stream of the backwash water, placing the porous media in a stationary location, and discharging the pollutants through a discharge pipe of the high speed filtration device before the pollutants settle. In addition, the present invention comprises a backwash method of the high speed filtration device using porous media.

14 Claims, 7 Drawing Sheets

(51) Int. Cl.
　　　*B01D 24/46*　　(2006.01)
　　　*C02F 1/52*　　(2006.01)
　　　*B01D 39/02*　　(2006.01)
　　　*B01D 41/02*　　(2006.01)
　　　*C02F 1/00*　　(2006.01)

(56) References Cited

U.S. PATENT DOCUMENTS 5,750,041 A * 5/1998 Hirane ................... 210/795
6,110,389 A * 8/2000 Horowitz ................ 210/794
6,365,044 B1 * 4/2002 Crane .................... 210/248
8,002,982 B2 * 8/2011 Burcham et al. ........ 210/247
2012/0211430 A1 * 8/2012 Choi ..................... 210/702

FOREIGN PATENT DOCUMENTS

KR　10-2005-0046076 A　5/2005
KR　　10-0827641 B1　5/2008

* cited by examiner a) Filtration process b) Discharging process of remained treated water c) Backwashing process d) Removing process of pollutants

HIGH SPEED FILTRATION DEVICE USING POROUS MEDIA, AND BACKWASH METHOD THEREOF

CROSS-REFERENCE TO RELATED APPLICATIONS

This patent application is a U.S. National Phase Application under 35 U.S.C. §371 of International Application No. PCT/KR2010/007312, filed Oct. 25, 2010, entitled HIGH SPEED FILTRATION DEVICE USING POROUS MEDIA, AND BACKWASH METHOD THEREOF, which claims priority to Korean Patent Application No. 10-2009-0101662, filed Oct. 26, 2009; Korean Patent Application No. 10-2010-0035553, filed Apr. 16, 2010; Korean Patent Application No. 10-2010-0035875, filed Apr. 19, 2010; and Korean Patent Application No. 10-2010-0036109, filed Apr. 19, 2010.

TECHNICAL FIELD

The present invention relates to a filtration device, and more specifically, to a high speed filtration device using porous filtration media for easy backwash. Further, the present invention includes a backwash method thereof.

BACKGROUND ART

Generally, there exist various pollutants and total phosphor (T-P) in raw and sewage water, wastewater and rain water, especially which have high phosphorus loading.

For that reason, the phosphor as nutrients flowed into a water discharging area causes large amounts of algae around eutrophicated waters, having an adverse effect on the ecosystem of aquatic lives.

To remove suspended solid (hereinafter, SS) or phosphor and the like, raw water that contains pollutants and phosphor has been treated with chemicals to form floc particles to be processed by flocculation and precipitation.

For this process, large scale processing facilities such as a service water supply or a sewage disposal plant are equipped with a coagulation tank, a flocculation tank and a precipitation tank separately, which requires a large space for facilities and has great difficulties in operating and managing thereof.

Moreover, a traditional sewage water treatment device is designed to use various filtration media such as sand and the like to remove pollutants such as insoluble SS and T-P, and decrease biological oxygen demand (BOD) more effectively.

However, the amount of pollutants flowed into a sewage treatment device varies depending on the velocity of flow and the flux of sewage water, which results in ineffective filtration process. In addition, fluctuations in head loss occurred in the filtration media and in the filtration processing time requires backwashing on a regular or irregular basis, causing a difficulty in setting a backwashing cycle.

If backwashing is not performed properly in the conventional high speed filtration device, filtration efficiency is greatly reduced. Further, the conventional method of backwash is designed to supply backwash water constantly such that the water overflows the filtration device to discharge pollutants along with the backwash water requiring substantial amount of backwash water consumption. Another problem for this process is that the backwash water needs to be filtered in another sewage treatment process as well.

SUMMARY

The present invention has been made to solve the problems as described above.

The present invention is to provide a method for removing various pollutants from point or nonpoint sources, specifically a method using backwash equipment to enhance effective removal of SS and T-P captured by a porous filtration media, thereby enabling constant filtration efficiency.

It is an object of the present invention to provide a high speed filtration device using porous filtration media to improve the filtration speed and perform backwash in consideration of the speed thereof.

For this purpose, the high speed filtration device using porous filtration media is characterized in that the inflow water to be filtered (treated) is guided to an upper portion of the high speed filtration device and is filtered in downflow and that the porous filtration media are backwashed for maintaining optimum filtration efficiency by blocking the flow of inflow water to be treated after sensing the level of the inflow water or the change in the flux of outflow of the water treated, supplying backwash water and/or air by upflow through the porous filtration media to separate pollutants in the porous filtration media by the collision and friction between the porous filtration media through flushing of the backwash water, stopping the backwash water supply and placing the porous filtration media in a stationary location, and discharging the backwash water supplied and the pollutants through a discharge pipe of the high speed filtration device before the pollutants settle down. In addition, the present invention comprises a backwash method of the high speed filtration device using porous filtration media.

The conventional filtration device aforementioned is disadvantageous in that during the backwash process, backwash water is required to be supplied consistently to discharge pollutants and backwash water such that the backwash water overflows a filtration basin, requiring huge amount of water consumption. By contrast, the high speed filtration device according to the present invention supplies backwash water to a constant level, that is, the level higher than the discharge pipe and not to overflow the high speed filtration device, which reduces the amount of backwash water consumption substantially. In addition, according to the present invention, simply supplying backwash water by upflow is enough to separate pollutants from a porous filtration media effectively.

Moreover, the present invention is characterized in that pollutants separated from porous filtration media and backwash water are discharged through an additional discharge pipe. The process is performed to prevent the pollutants from settling down or contacting in the filtration media bed to maintain porosity of a porous filtration media.

According to other embodiment of the present invention, open and close means is provided at the inlet of a discharge pipe to control discharging of backwash water and pollutants. Specifically, the open and close means is opened from the top to control the velocity of backwash water and pollutants, thereby preventing porous filtration media from being washed away into the discharge pipe, and at the same time discharging pollutants swiftly to prevent them from being settled down on the filtration media bed.

According to another embodiment of the present invention, processes of coagulation and filtration are performed in a single housing, in which the upper portion of the housing acts as a reaction vessel with the lower portion thereof as a filtration basin.

In addition, the present invention is characterized in that there includes a backwash method of high speed filtration device using porous filtration media.

According to the embodiments of the present invention, the high-speed filtration device is provided for performing a backwash process by downflow using porous filtration media in the high speed filtration device, to maintain optimum filter efficiency of high-speed filtration device.

More specifically, the high-speed filtration device according to the present invention serves the purpose of the present invention by reducing unnecessary excessive consumption of backwash water.

In contrast to other conventional methods of backwashing, the present invention provides a backwashing method that significantly reduces the required time for backwashing, minimizes the power needed to supply the backwash water, as well as boosting the longest possible operating time of filtration.

In addition, the present invention provides a method in which after the process of backwash, pollutants are swiftly discharged before being settled into the filtration media bed, the open and close means is configured to control the flux of the backwash water to prevent beforehand the loss of porous filtration media comprising the filtration media bed.

DETAILED DESCRIPTION

Hereinafter, the high speed filtration device using porous filtration media of the present invention will be described in detail in reference to accompanying drawings.

Figure 1:
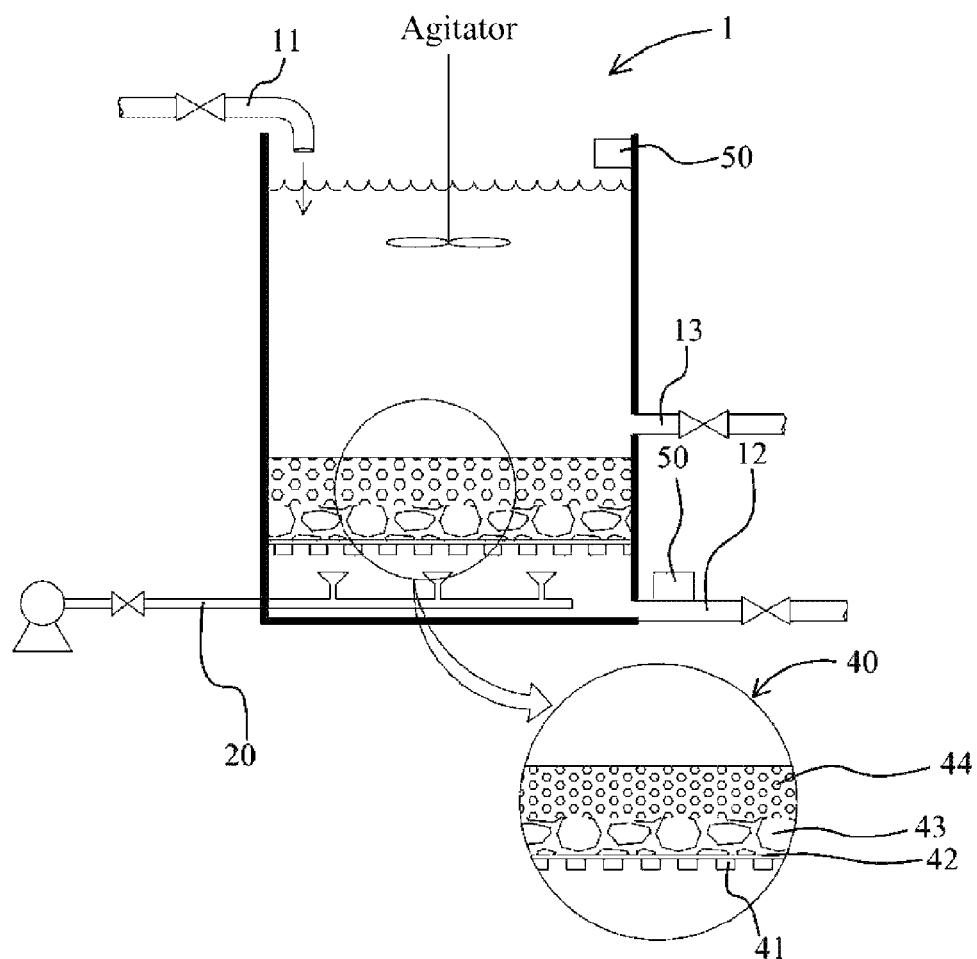
FIG. 1 is a schematic cross-sectional view of the high-speed filtration device using a porous filtration media according to example 1 of the present invention.

FIG. 1 is a schematic cross-sectional view of the high speed filtration device using porous filtration media.

Here, as widely known to those skilled in the art, the inflow water refers to sewage water guided from point or non-point sources, or may be water once treated during the pretreatment process, for example, in a mixing tank, or settling tank.

Further, treated water refers to water chemically, physically and biologically treated through filtration process, and specifically according to the present invention, refers to water filtered through filtration media bed.

As shown in drawings, a high speed filtration device 1 of the present invention includes downflow filtration tank including housing, wherein inflow water transferred through an inflow pipe 11 is guided into the high speed filtration device 1 where specifically, the inflow water is guided from top to bottom, that is, by downflow to be filtered through a filtration media bed 40, and by using a backwash equipment 20 the backwash process is performed in an easy and rapid manner.

The filtration media bed 40 is provided in parallel with the bottom surface of the housing, wherein the filtration media bed 40 is arranged to be apart from the bottom surface of the housing to provide spacing between the filtration media bed 40 and the bottom surface of the housing, which is a space to be used as a passage of filtered water. The treated water is discharged through an outflow pipe 12.

The high speed filtration device may be further provided with an agitator for various uses. For example, during filtration, the agitator is used to facilitate mixing of the inflow water with coagulant, and during the process of backwash when the porous filtration media is elevated with the rise of the backwash water level, the agitator is operated to cause collision and friction between the porous filtration media in a short time. Further, after the porous filtration media settles down, the agitator is used with the backwash water to make the floated pollutants settle down slowly.

More preferably, the filtration media bed 40 is arranged in parallel with and apart from the bottom surface of the housing, and filled with the porous filtration media 40.

The configuration of the filtration media bed 40 is described in detail in FIG. 1. Selectively, the filtration media bed comprises a support unit 41, a wire mesh 42, a coarse sand layer 43, and a porous filtration media 44. The support 41 is arranged across the inside of the housing, firmly enough to support the wire mesh, coarse sand layer and the porous filtration media to be placed thereon. The wire mesh is arranged on the support unit 41 as shown in drawings. It is desirable that the wire mesh 42 has a close mesh such that it is to prevent a component member, for example, coarse sand to be placed thereon, from falling down through the filtration media bed 40. As described above, the wire mesh is used not only to prevent the sand from being washed away but also to enable the upflow of backwash water during backwashing of the filtration media bed 40. As known to those skilled in the art, instead of a wire mesh, a perforated plate and the like can be used having a texture close enough to prevent sand from falling down therethrough, while enabling the backwash water, or treated water to pass through.

More effectively, one or more of the wire mesh 42 can be stacked and used to prevent sand from being washed away.

The porous filtration media 44 is placed on coarse sand layer 43 which is arranged on the wire mesh 42 to filter the inflow water by downward in the high speed filtration device.

During filtration, when pollutants are accumulated on the filtration media bed, the inflow water is no longer filtered normally, reducing the discharge of treated water. Subsequently, the inflow water level is elevated in the filtration device 1. According to the present invention, sensor 50 is used to sense the change of the inflow water in the high speed filtration device 1, for example, such as the level of the inflow water, the flux of treated water, or the level of the backwash water. For example, when there is a change in the level of the inflow water, and more specifically, when the level of the inflow water is elevated above the predetermined level after sensing the level change by the sensor 50, or when the flux of the treated water through the outflow pipe 12 is below the predetermined level after measuring the flux of the treated water real time, or on an irregular basis, a backwash equipment 20 is used to supply the backwash water by upward to the filtration media bed 40 from the bottom of the high speed filtration device 1. Selectively, the backwash equipment 20 is used to supply the backwash water and/or air to facilitate the backwash process for separating pollutants. In addition, the sensor 50 can also sense the level of backwash to prevent the backwash water from overflowing an upper portion of the high speed filtration device during backwash, while maintaining the backwash water level higher than the filtration media bed.

The accumulation of pollutants (flocculated or settling materials) blocks pores in the filtration media bed 40, deteriorating filter efficiency. To solve the problem, the present invention is provided with such backwash equipment.

The backwash equipment comprises a backwash pump, and a pipe that extends from the pump to the inside of the housing. The pipe is desirably placed between the bottom of the housing and the filtration media bed.

The backwash water is upwardly supplied into the inside of the housing in the opposite direction of the flow of the inflow water to be treated, such that the porous filtration media 44 blocked due to the pollutants in the media filter bed 40 are entrained by the backwash water and dispersed floatingly to separate the pollutants from the surface of the porous filtration media, thereby solving the problem of blockage.

The pollutants separated by the backwash process are floated (for example, floated to the upper portion zone of the filtration media bed) to be transferred to the outside through the discharge pipe 13 which is provided at one side of the housing.

Selectively, some of the treated water discharged through the outflow pipe 12 can be sent back to the housing for use as backwash water.

The pollutants separated by the backwash process are floated to upper portion of the high speed filtration device 1, and more specifically above the filtration media bed 40, to be transferred to the outside (for example, backwash water discharge tank) through the outflow pipe 13 for backwash water to be discharged which is provided at one side of the high speed filtration device 1. Meanwhile, unlike the porous filtration media which floats with a backwash water supplied upflow, the coarse sand layer 43 will not float and/or buoy.

In the embodiments of the present invention, the high speed filtration device 1 is provided with a discharge pipe 13 at one side of the high speed filtration device, and more specifically, the discharge pipe 13 is positioned higher than the filtration media bed 40, and lower than the upper portion of the high speed filtration device 1 as shown in drawings. The discharge pipe 13 is positioned adjacent to the upper portion of the filtration media bed 40, while lower than the middle point between the upper portion of the housing and filtration media bed.

The discharge pipe 13 is additionally provided with a screen (not shown), which serves as a means to prevent the porous filtration media from unexpectedly being washed away with the flow of the backwash water after backwashing. The spacing of the screen is preferably smaller than the diameter of the porous filtration media.

Here, the porous filtration media 44 consists of porous particles made by mixing glass powder of small particle size with a blowing agent or vesicant, to be heated at a high temperature (for example, 800~1100° C.) and pulverized after cooling to thereby have a diameter of less than 3 mm, dry bulk density of 0.4~1.2 $g/cm^3$, and a water saturated bulk density of 1.2~2.0 $g/cm^3$, for use in water purification. For reference, the porous filtration media 44 of the present invention has a water saturated bulk density of 1.2~2.0 $g/cm^3$ and preferably, of 1.3~1.8 $g/cm^3$. Regarding the water saturated bulk density of the porous filtration media 44 described above, if the bulk density is less than 1.2 $g/cm^3$, it is almost the same as that of water, therefore the porous filtration media is likely to be washed away with the flowing water (for example, backwash water), and may be unevenly distributed in depth. Further, if the bulk density is more than 2.0 $g/cm^3$, it is difficult to make the porous filtration media be entrained by backwash water and rise, thereby it is undesirable for being used in a backwashing method of the present invention embodied by the rise of the porous filtration media, and the bulk density of more than 2.0 $g/cm^3$ is also disadvantageous in that the spray pressure of the backwash water should be significantly higher to rise the porous filtration media.

In other words, the water saturated porous filtration media having a higher density than water (1 $g/cm^3$) can be readily placed in a stationary position instead of being moved up and down with the down flowing inflow water, while having a lower density than sand allows the porous filtration media to easily rise and be entrained with the supply of backwash water when backwashing, thereby to be easily separated from pollutants by collision between the porous filtration media.

The porous filtration media 44 is made by mixing glass powder with a vesicant or blowing agent, heating the mixture at a high temperature and granulating after cooling it. Then, the porous filtration media 44, when granulated into small particles with air bubble inside settles down in water.

Figure 2:
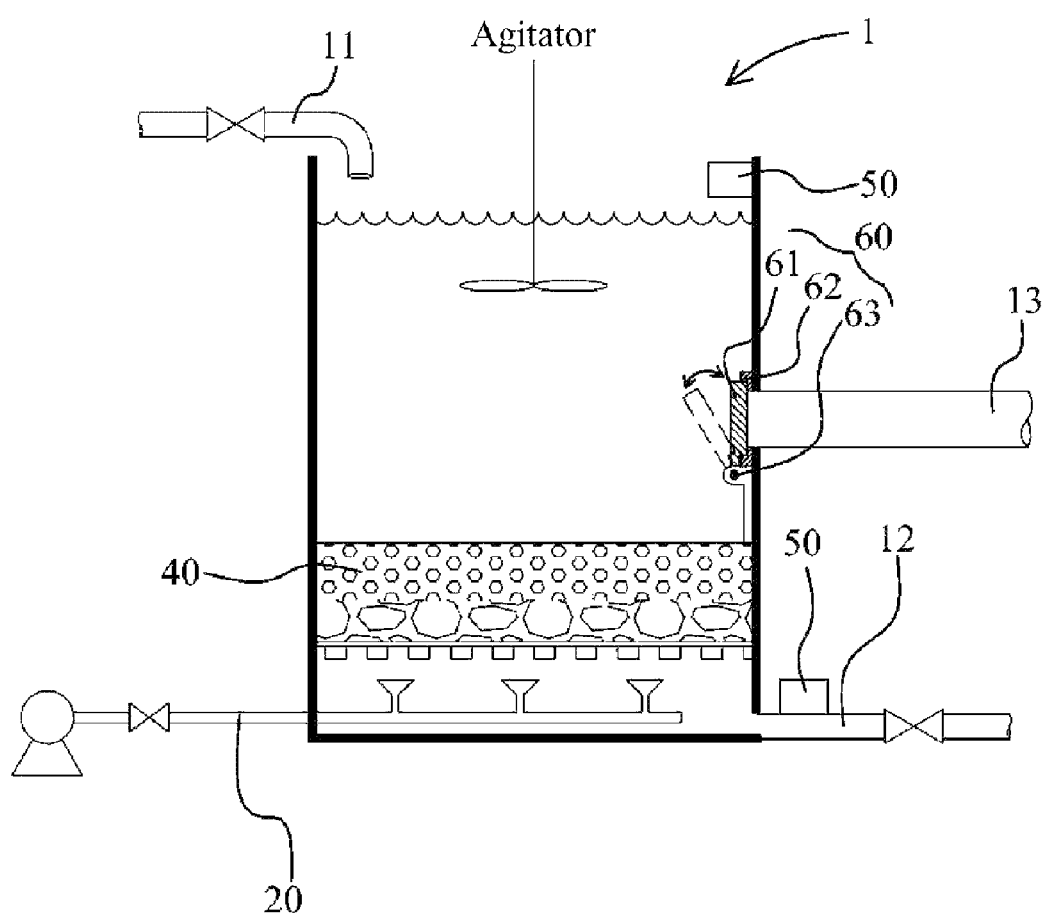
FIG. 2 is a schematic cross-sectional view of the high-speed filtration device according to example 2 of the present invention.

FIG. 2 is a schematic cross-sectional view of the high speed filtration device according to example 2. Example 2 of the present invention shown in FIG. 2 has the same configuration as example 1 shown in the FIG. 1, except that the high speed filtration device of example 2 is provided with an open and close means 60 at a discharge pipe 13. Accordingly, detailed description of a similar or the same components will be omitted to simplify.

The sensor 50 senses the level of backwash water when backwashing to maintain the backwash water level higher than the filtration media bed and not to overflow the upper portion of the housing.

As shown in FIG. 2, the present invention is provided with an open and close means 60 at one side of the high speed filtration device 1, wherein the open and close means 60 is fluidly communicated with housing and discharge pipe 13 to enable the opening and closing thereof. Specifically, the open and close means 60, as shown in FIG. 2, is positioned higher than the filtration media bed 40 and lower than upper portion of the housing (shown in thick lines) of the high speed filtration device 1. The open and close means 60 is preferably positioned adjacent to the upper portion of the filtration media bed 40, while lower than a middle point between the upper portion of the housing and the filtration media bed 40.

Specifically, the open and close means 60 can be opened partially or completely to discharge the backwash water that backwashed the porous filtration media to the outside (that is guided through the discharge pipe 13), and the pollutants separated from the filtration media by the backwash water before being settled down onto the filtration media bed 40. The open and close means 60 is shut during filtration or backwash processes.

The open and close means 60 is a hinged-type gate as shown in FIG. 2. A plate or disc 61 of the open and close means 60 is rotatably connected by a hinge around a hinge part 63 on the frame 62 that circumferentially surrounds the inlet of the discharge pipe 13. The discharge pipe 13 can be opened and closed by a rotating movement (shown with an arrow) of the disc 61. With this configuration, the open and close means would not be opened by the treated water to be filled in the housing, or the backwash water pressure.

Specifically, the open and close means is characterized in that the hinge part 63 is arranged at the lowest part of the frame 62 to allow the gate to be opened from the top when the disc 61 opens. In this arrangement, when the pollutants are separated by collision between the porous filtration media floating in the backwash process, and the supply of backwash water is stopped, the porous filtration media is placed back or settled down on the coarse sand layer 43, and the pollutants separated from the porous filtration media can be discharged swiftly from the open and close means 60 through the discharge pipe 13.

Selectively, the open and close means 60 can be opened by rotatably moving the disc 61 on the frame with a reciprocating movement of a cylinder (not shown). Or a hinge shaft can be connected to a motor to open and close the disc 61 by motor driving.

As described above, the disc 61 is opened from the top to discharge the backwash water at the upper portion of the housing, and the porous filtration media floated in the housing settles shortly after backwashing to be placed uniformly in the filtration media bed 40 without being affected by the outflow of the backwash water. The porous filtration media 44 (see FIG. 1) should be raised or lifted by upflow stream of the backwash water, and preferably should not be affected by the stream of the supply of the inflow water to be treated and the discharge of the backwash water.

Figure 3:
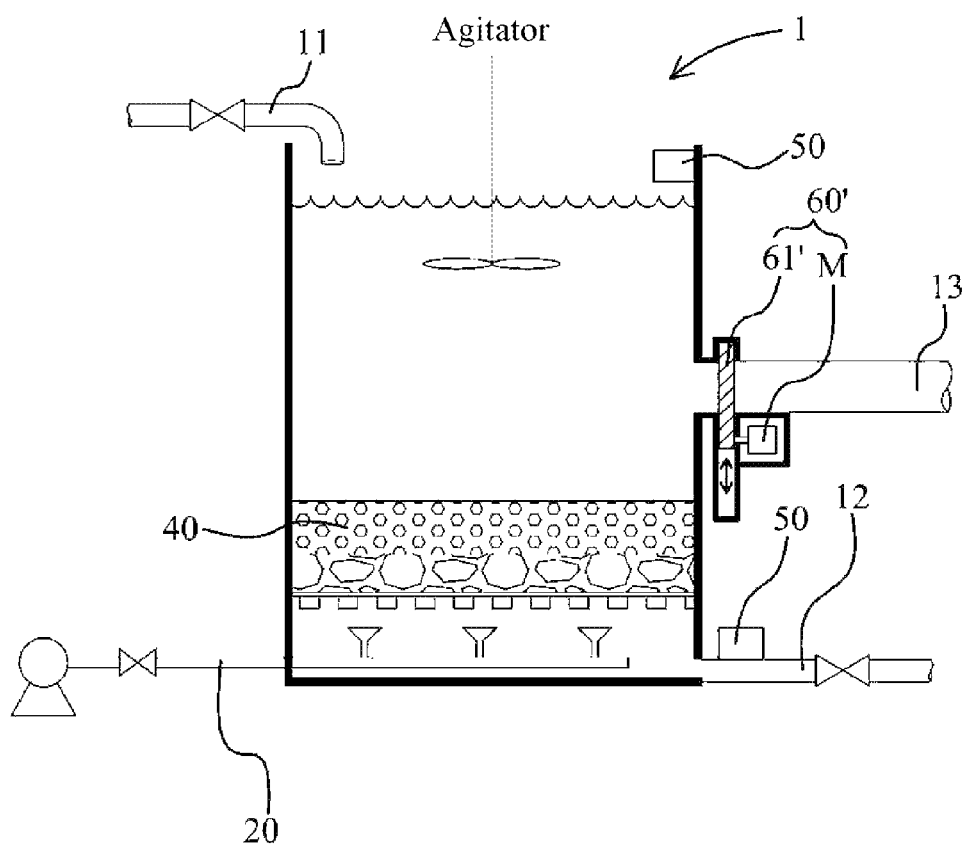
FIG. 3 is. a schematic cross-sectional view of the high-speed filtration device according to example 3 of the present invention

FIG. 3 is a schematic cross-sectional view illustrating a high speed filtration device according to the present invention. Example 3 of the present invention shown in FIG. 3 has the same configuration as that of example 2, except that the high speed filtration device in example 3 is provided with an elevating type open and close means 60' for discharging backwash water, which is a substitute for hinged type open and close means 60 provided on a housing of the high speed filtration device in example 2 shown in FIG. 2. Accordingly, similar or the same elements will not be described in detail to simplify the present invention.

Like the open and close means 60 in FIG. 2, the open and close means 60' should be opened such that the backwash water for backwashed the porous filtration media, and the pollutants that were separated by the backwash water are swiftly discharged through the discharge pipe 13 before being settled into the filtration media bed 40. The open and close means 60' should be closed during filtration and backwash processes.

The open and close means 60' is an elevating type gate as shown in FIG. 3. A plate or disk 61' of the open and close means 60' is configured to open and close the gate of the discharge pipe 13 through reciprocating motion of ascending and descending. With this configuration, the open and close means would not be opened by the inflow water to be treated filled in the housing, nor by the backwash water pressure.

Meanwhile, the open and close means 60' is configured to be opened and closed in a vertical motion of the disc 61' with various elevating devices (M).

Preferably, the open and close means 60' is designed to be opened from the top as that of example 2.

Figure 4:
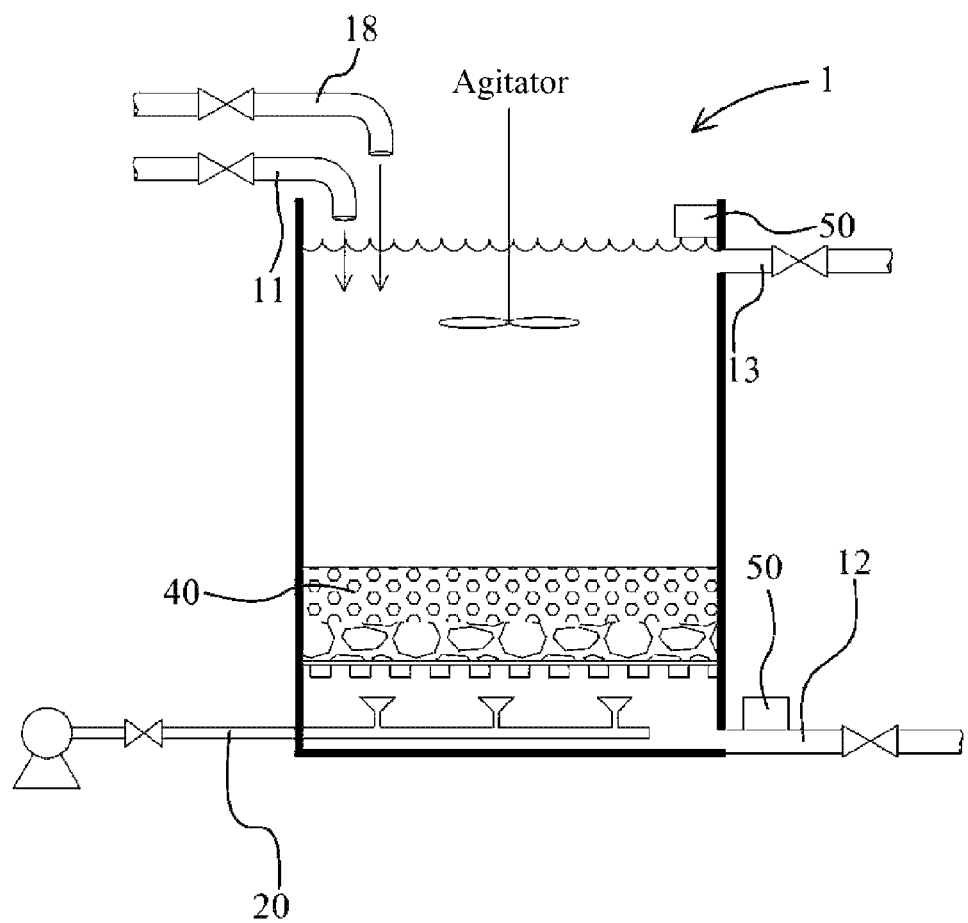
FIG. 4 is a schematic cross-sectional view of the high-speed filtration device according to example 4 of the present invention.

FIG. 4 is a schematic cross sectional view of the high speed filtration device according to example 4 of the present invention.

The high speed filtration device according to example 4 of the present invention has a configuration similar to that of example 1 to example 3, as described above, including the housing which is vertically arranged on the bottom surface and around the circumference thereof, and the filtration media bed 40 which is arranged parallel to the bottom surface inside the housing.

Filtration media bed 40 according to the present invention may be configured to add a process for coagulating pollutants by feeding a coagulant into the inflow water through a chemical supplier 18. As described above, the inflow water supplied through the inflow pipe 11 is collected in the housing of the high speed filtration device 1, and a coagulant is supplied to the housing of the high speed filtration device through a chemical feeder 18. That is, the housing is used as a reacting basin for a coagulation reaction by mixing the inflow water with a coagulant.

Coagulated materials (or floc) are filtered in contact with the porous filtration media 44 (see FIG. 1) of the filtration media bed 40. After the continuous process of coagulation and filtration, the coagulated materials are captured around the porous filtration media, in which some materials thereof are accumulated on the porous filtration media 44 and remain in the housing.

Additionally, a rotating agitator is used to make the inflow water constantly fluctuate in the housing such that the inflow water is stirred up above the filtration media, and thus preventing the floc or sediment from being accumulated thereon, and preventing filtration loss. Further, the rotating agitator mixes the inflow water supplied into the housing with a coagulant fed through a chemical feeder 18 to facilitate coagulation of the pollutants.

Figure 5:
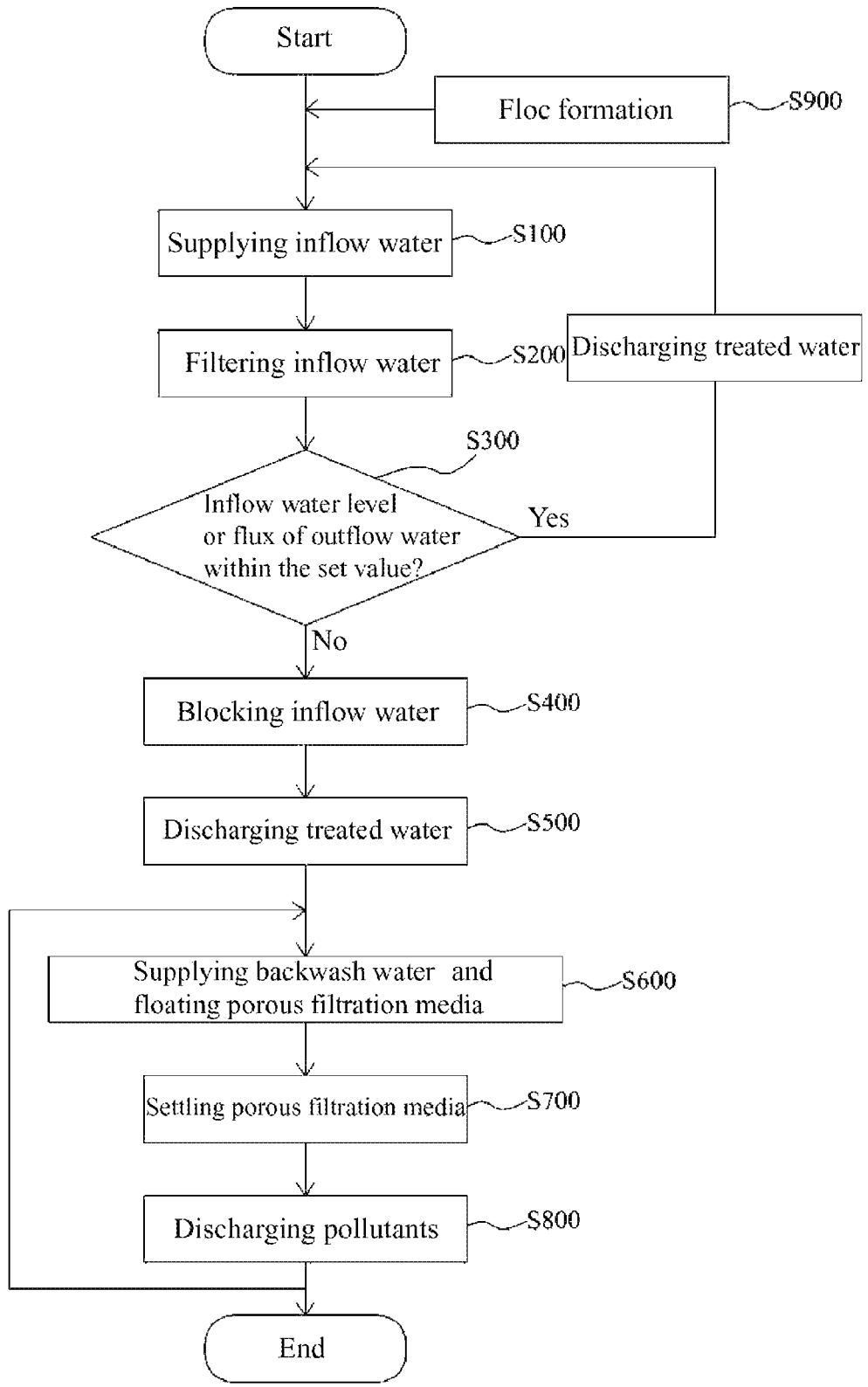
FIG. 5 is a flowchart illustrating a backwash method of the high-speed filtration device according to the present invention.

FIG. 5 is a schematic view illustrating step-by-step processes of backwash method according to the embodiment of the present invention, which will be described in reference with example 1 shown in FIG. 1 (for the reference numerals of each component of the high speed filtration device of the present invention, refer to FIG. 1).

The backwash method of the high speed filtration device according to the present invention includes step S100 in which the inflow water is guided through the inlet pipe into the high speed filtration device.

Step S900 can be additionally included in which the inflow water guided though the inlet pipe 11 into the high speed filtration device 1 is mixed with a coagulant, thereby forming floc. The floc activating contact with the porous filtration media may provide significant treatment efficiency.

In step S100, the high speed filtration device 1 is supplied with the inflow water, which then falls into the housing thereof in free fall under gravity, when the inflow water flows through the filtration media bed 40 in the high speed filtration device, the filtration step of S200 in which the pollutants are filtered by the porous filtration media is performed.

As the inflow water is constantly supplied, the high speed filtration device continues to perform the filtration step of S200, which inevitably reduces filtration efficiency compared to the first round of filtration, due to the overtime repeated filtration, or higher concentration of pollutants in the inflow water.

If an excessive amount of pollutants are captured on the surface of the porous filtration media of the media filter bed 40, the resistance to filtration becomes greater, reducing filtration efficiency, and the speed of the inflow water going through the media filter bed 40 becomes substantially slow. However, the inflow water level rises due to continuous supply of inflow water in the housing of the high speed filtration device. That is, if the filtration media bed 40 is substantially blocked, the process efficiency is degraded, reducing the flow of treated water discharged through the outflow pipe 12. The change of water level in the housing or the flux of treated water is sensed by the sensor 50 (step S300), thus, the backwashing time is determined.

Preset values (such as values for the level of the inflow water, the flux of flow of treated water and the like) are the factors that determine the backwashing time. For that reason, in case of a need for the backwash, the inlet pipe is to be shut (step S400). By blocking the supply of the inflow water, the untreated inflow water can be prevented from flowing into the high speed filtration device 1, and only the remained inflow water can be filtered out for backwashing.

Step S500 is a process in which with no inflow water additionally supplied into the high speed filtration device, only the inflow water remained in the high speed filtration device is filtered to be discharged through the outflow pipe 12, which nearly empties the housing of the high speed filtration device. Selectively, in the discharging step of S500, the inflow water of the high speed filtration device, that is, the water in the housing is discharged, and specifically, only the water above the upper portion of the filtration media bed can be discharged to reduce the supply of the backwash water.

Following the process is a step S600 where the backwash water is supplied by upflow below the filtration media bed 40 of the high speed filtration bed. As described above, the backwash water is supplied by upflow to go through the filtration media bed from the bottom to the top, in which the backwash water should be uniformly distributed all over the filtration media bed 40. If distributed unevenly, the inflow water will only go through the backwashed part during filtration, thereby being high speed filtration, while blocking may occur at an insufficiently backwashed part of the filtration media bed.

The backwash water is supplied to backwash the filtration media bed 40, and the porous filtration media 44 in filtration media bed 40 is entrained and rises along with the backwash water. During the process, backwash water and/or air is sprayed to separate pollutants attached to the porous filtration media by the collision and friction between the porous filtration media, or by flowing of the porous filtration media through the stream of the backwash water.

For reference, it is preferable to set limits to the supplying amount of the backwash water so as not to overflow the high speed filtration device of the present invention, and more preferably the level of the backwash water to be supplied is higher than the discharge pipe 13, and lower than the top of the high speed filtration device.

Following the process is a step S700 in which after blocking the supply of the backwash water, the porous filtration media is settled down on the coarse sand layer 43. Being heavier than the pollutants, the porous filtration media settles down earlier than the pollutants.

After the porous filtration media is settled sufficiently, a step S800 is performed in which the backwash water containing pollutants separated from the porous filtration media is swiftly discharged. The discharge pipe 13 is opened through which the pollutants are discharged along with the backwash water. The porous filtration media should not be discharged through the discharge pipe 13.

After discharging the pollutants and the backwash water, the discharge pipe 13 is closed, and the inflow water is re-supplied into the high speed filtration device.

More preferably, when the pollutants are not separated and removed effectively from the porous filtration media, steps of S600 to S800 are repeatedly performed to maximize filtration efficiency, thereby restarting the step S100 of supplying the inflow water.

FIG. 6a-6d show schematic views illustrating the operation of the high speed filtration device according to the backwash method shown in FIG. 5.

Figure 6A:
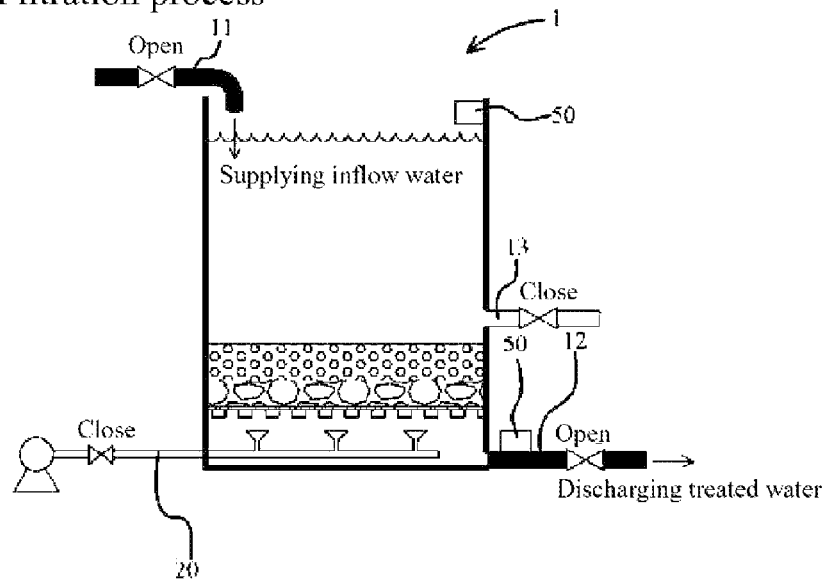
FIG. 6 is a schematic view illustrating steps of backwashing process of the high speed filtration device according to the backwashing method in FIG. 5.
Figure 6B:
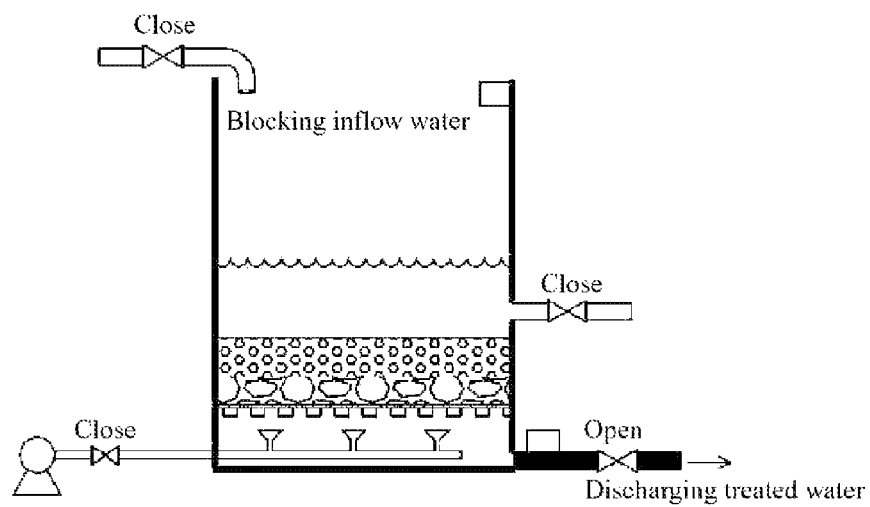
Figure 6C:
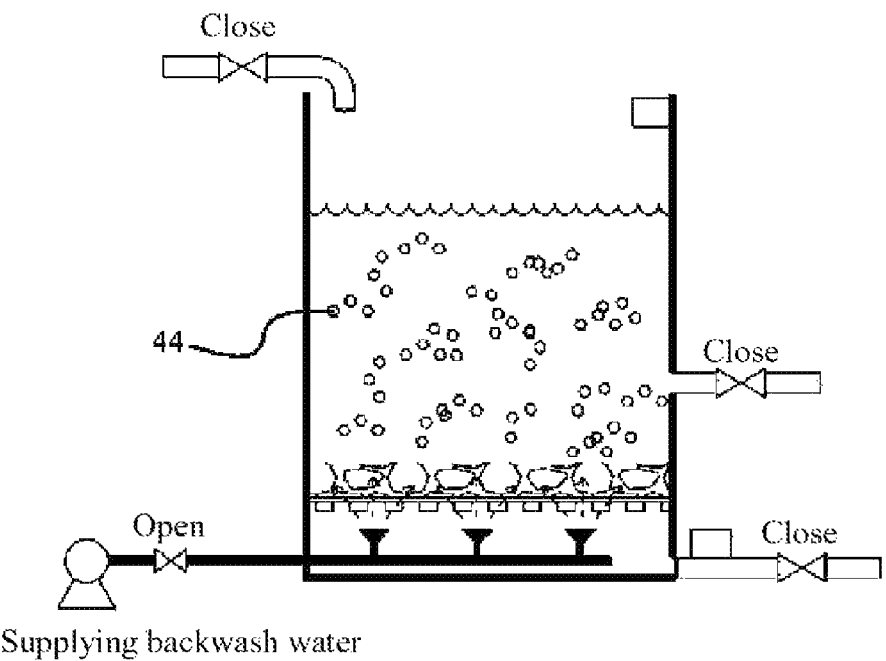
Figure 6D:
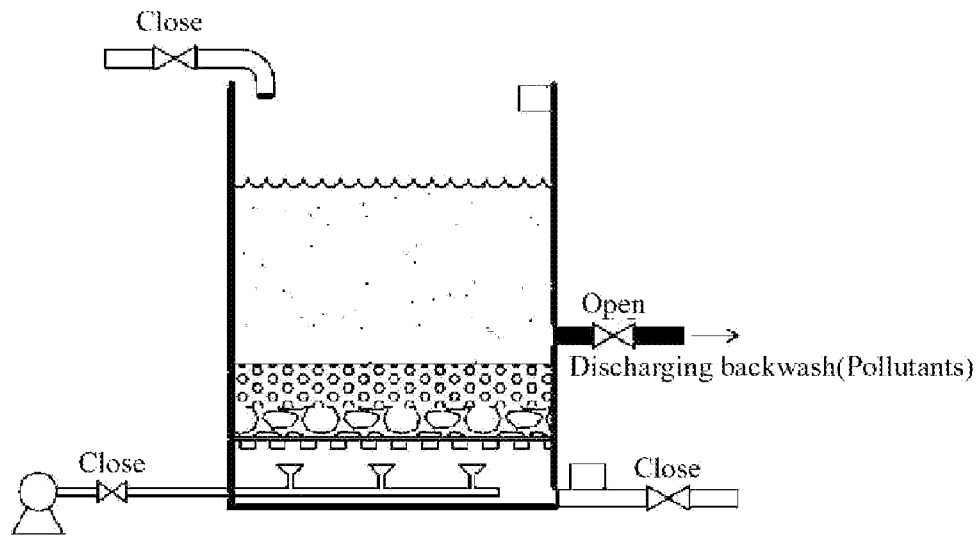

That is, FIG. 6a illustrates the high speed filtration device that performs the filtration process according to the steps of S100 and S200 of the backwash method. FIG. 6b illustrates the high speed filtration device that performs the process of emptying the inside of the high speed filtration device to prepare backwashing. FIG. 6c, which corresponds to the step of S600, illustrates the high speed filtration device that performs the process of backwashing. As shown in FIG. 6c, the backwash water (and air) to be supplied to the backwash equipment 20 is sprayed uniformly to the filtration media bed, filling the high speed filtration device, to thereby raise and float the porous filtration media 44 and pollutants. In this way, as the porous filtration media 44 floats upward, the pollutants captured or accumulated on the surface thereof are separated as described above. FIG. 6d illustrates the high speed filtration device that performs the steps of S700 and S800 in which after the porous filtration media floated by the backwash water settles down, the pollutants and the backwater are discharged. FIG. 6a-6d show detailed illustration of the backwash method applied to the high speed filtration device according to the present invention, in which for better understanding, to distinguish the inflow water and/or treated water stream guided through the pipe (11, 12, 13) when water flows through the pipe, the pipe is colored in black, while water does not flow in the pipe, the pipe is not colored in black. Further, the inside of the high speed filtration device is not colored separately to clearly illustrate the structure thereof.

Moreover, while the invention has been described with reference to the drawings attached, it is not confined to the details set forth, but is intended to cover such modifications or changes as may fall within the scope of the following claims.

What is claimed is:

1. A high speed filtration device using porous filtration media comprising:
a housing;
an inlet pipe for supplying inflow water to be filtered into the housing;
a filtration media bed arranged above a bottom surface of the housing;
an outflow pipe arranged below the filtration media bed to discharge water filtered through the filtration media bed out of the housing;
a backwash equipment arranged between the bottom surface of the housing and the filtration media bed to supply backwash water upflow; and
a discharge pipe for discharging backwash water and pollutants above an upper portion of the filtration media bed,
characterized in that the filtration media bed is provided with a porous filtration media,
the inflow water is filtered by downflow through the filtration media bed, the porous filtration media consists of particles formed by mixing glass powder with vesicant, heating at a high temperature and pulverizing after cooling, thereby having particles of less than 3 mm in diameter, 0.4~1.2 $g/cm^3$ in dry bulk density and 1.2~2.0 $g/cm^3$ in water saturated bulk density,
during backwashing process, a level of the backwash water is set to be higher than the discharge pipe and lower than an upper portion of the housing so as not to overflow the housing,
the discharge pipe is positioned at a lower portion than a middle point between the upper portion of the housing and the filtration media bed,
the porous filtration media is entrained and rises along with pollutants by supply of backwash water, and after the porous filtration media settled down, the backwash water and the pollutants are discharged through the discharge pipe.

2. The high speed filtration device of claim 1, further comprises more than one sensor which senses a level of the inflow water in the housing or flux of outflow of treated water.

3. The high speed filtration device of claim 1, wherein the filtration media bed comprises a support unit arranged across the housing, more than one wire mesh or perforated plate, a coarse sand layer that does not pass through the wire mesh, and the porous filtration media.

4. The high speed filtration device of claim 1, wherein the porous filtration media has a dry bulk density of 0.4~0.6 g/cm$^3$, and a water saturated bulk density of 1.3~1.8 g/cm$^3$.

5. The high speed filtration device of claim 1, wherein the housing is additionally provided with an agitator.

6. The high speed filtration device of claim 1, wherein the discharge pipe is additionally provided with a screen.

7. The high speed filtration device of claim 1, wherein an open and close means is provided at an inlet of the discharge pipe to control a discharge of backwash water.

8. The high speed filtration device of claim 7, wherein the open and close means is a hinged gate comprising a frame which circumferentially surrounds an inlet of the discharge pipe at one side of the housing, a disc connected to the frame by a hinge, and a driving means to facilitate a rotating motion of the disc.

9. The high speed filtration device of claim 7, wherein the open and close means is an elevating gate comprising a disc which ascends and descends to open and close the discharge pipe at one side of the housing, an elevating motion unit for ascending and descending of the disc.

10. The high speed filtration device of claim 1, wherein a rotating agitator is provided to fluctuate the inflow water, which stirs water above a surface of the filtration media bed, thus delaying settling of sediment and preventing filtration loss, and to mix the inflow water with a coagulant fed by a chemical feeder to facilitate flocculation of sediment, thereby enabling the processes of flocculation and filtration at the same time in a single reaction tank.

11. A backwash method of a high speed filtration device comprising:
   a housing;
   an inlet pipe for supplying inflow water into the housing;
   a filtration media bed arranged above a bottom surface of the housing, and is provided with a porous filtration media;
   an outflow pipe positioned at a lower portion of the housing to discharge water filtered through the filtration media bed out of the housing;
   a backwash equipment positioned below the filtration media bed to supply backwash water by upflow; and
   a discharge pipe arranged to extend outward at one side between an upper portion of the housing and the filtration media bed to discharge backwash water;
   wherein the backwash method of the high speed filtration device comprising the operations of:
   blocking supply of the inflow water to be filtered;
   discharging water in the housing through the outflow pipe;
   supplying backwash water with controlling backwash water level to be higher than the discharge pipe and not to overflow the housing of the high speed filtration device, and floating and raising the porous filtration media having a density higher than that of water and lower than that of sand by supplying backwash water;
   blocking supply of backwash water and settling the porous filtration media in a stationary location;
   discharging backwash water containing pollutants in which the discharge pipe is positioned lower than a middle point between an upper portion of the housing and the filtration media bed, such that backwash water is discharged through the discharge pipe without overflowing the housing; and
   transferring backwash water discharged through the discharge pipe into a tank of discharged water.

12. The backwash method of the high speed filtration device of claim 11 additionally comprises an operation in which before supplying inflow water into the high speed filtration device, mixing a coagulant with inflow water to form floc.

13. The backwash method of the high speed filtration device of claim 11 additionally comprises an operation in which during filtration of inflow water, the high speed filtration device is provided with a sensor to sense water level therein or flux in the outflow pipe.

14. The backwash method of the high speed filtration device of claim 11, characterized in that the following operations are repeatedly performed:
   supplying backwash water with controlling backwash water level to be higher than the discharge pipe and not to overflow the housing of the high speed filtration device, and floating and raising the porous filtration media having a density higher than that of water and lower than that of sand by supplying backwash water;
   blocking supply of backwash water and settling the porous filtration media in a stationary location; and
   discharging backwash water containing pollutants in which the discharge pipe is positioned lower than a middle point between an upper portion of the housing and the filtration media bed, such that backwash water is discharged through the discharge pipe without overflowing the housing.

* * * * *